United States Patent [19]

Reppert

[11] 4,036,530

[45] July 19, 1977

[54] WHEEL ADAPTOR DEVICE

[75] Inventor: Merlyn R. Reppert, Torrance, Calif.

[73] Assignee: W. R. Grace & Co., New York, N.Y.

[21] Appl. No.: 565,352

[22] Filed: Apr. 7, 1975

Related U.S. Application Data

[63] Continuation-in-part of Ser. No. 521,026, Nov. 5, 1974, abandoned.

[51] Int. Cl.$^2$ .............................................. B60B 3/16
[52] U.S. Cl. ................... 301/9 DN; 85/1 R; 403/14; 403/DIG. 3
[58] Field of Search ........... 301/9 DN; 85/1 R, 32 R, 85/35; 151/7; 403/DIG. 3, 14, 13, 408; 52/758 F

[56] References Cited

U.S. PATENT DOCUMENTS

| | | | |
|---|---|---|---|
| 1,506,823 | 9/1924 | Francoeur | 85/35 X |
| 3,041,913 | 7/1962 | Liska | 85/1 |
| 3,308,865 | 3/1967 | Raichelson | 151/7 |
| 3,329,468 | 7/1967 | Beith | 301/9 DN |
| 3,494,669 | 2/1970 | Reppert | 301/9 DN |
| 3,679,266 | 7/1972 | Jenkins | 301/9 DN |
| 3,749,450 | 7/1973 | Senter et al. | 301/9 DN |
| 3,901,122 | 8/1975 | Novotny | 85/32 T |

Primary Examiner—Robert B. Reeves
Assistant Examiner—Charles A. Marmor
Attorney, Agent, or Firm—William Kovensky; Kenneth E. Prince

[57] ABSTRACT

An adaptor bolt to permit fitting wheels having a given bolt hole circle diameter to wheel studs having a different circle diameter. The kit is made up of a plurality of adaptor bolts each comprising an internally threaded bore located eccentrically in the bolt with respect to its external threads. The internal threads fit on the studs and cap nuts fit on the external threads to mount the wheel on the adaptor bolts. Friction increasing devices are provided on the internal threads to hold the adaptor bolts in various adjusted positions defining different diameter bolt circles.

8 Claims, 6 Drawing Figures

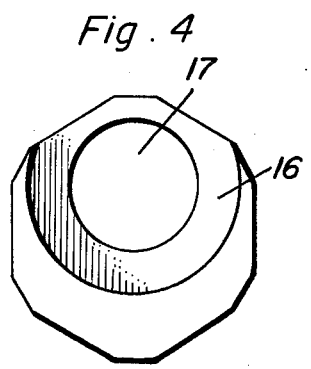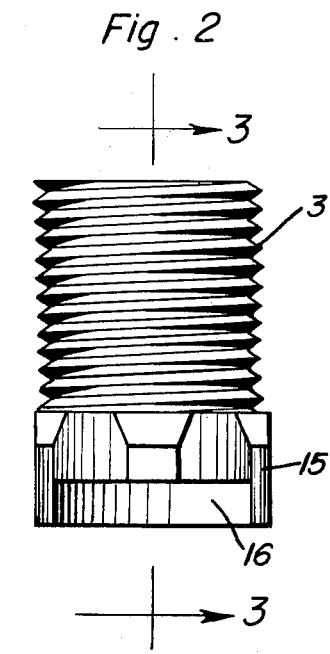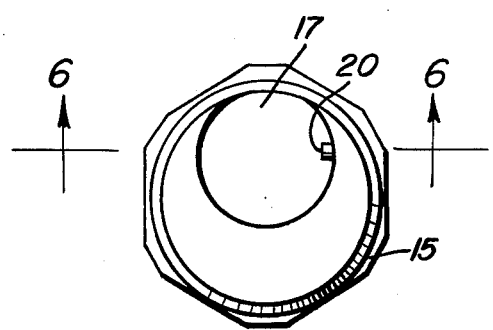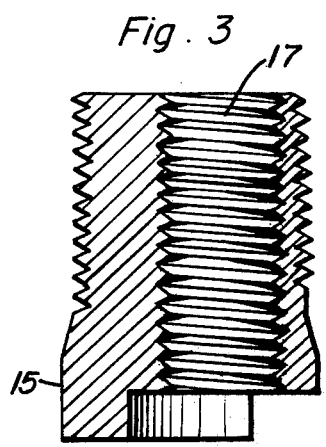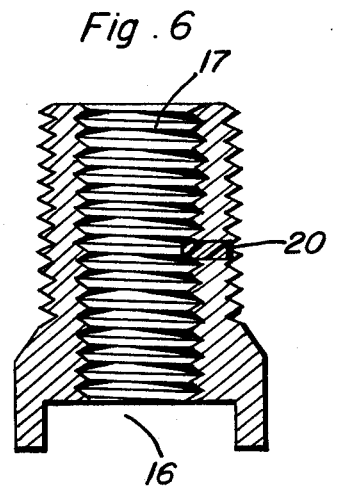

WHEEL ADAPTOR DEVICE

This is continuation-in-part of my co-pending application Ser. No. 521,026, filed Nov. 5, 1974, now abandoned.

This invention relates to the automobile industry, and in particular to the use of automobile wheels. By the use of this invention wheels having a given bolt hole diameter may be fitted to hubs having bolt circles of a different diameter.

As is well known, and this is particularly true for American made automobiles, the bolt circles on the wheel drums of full-size Fords, Chevrolets, Oldsmobiles, and the like vary slightly, so that a wheel designed for a Chevrolet will not fit the bolts on the wheel drum of a Ford or of an Oldsmobile. The same is true for many of the smaller makes of cars, and this situation obtains not only for five-bolt wheel drums, but also for four-bolt wheel drums. In this connection it may be noted that the standard Ford wheel drum has a bolt circle of 4½ inches, the Chevrolet 4¾ inches, and the Oldsmobile, 5 inches.

It is an object of this invention to provide an adaptor kit or device which will permit fitting a wheel having holes pre-drilled in a certain bolt circle pattern, to fit either Ford, Chevrolet, or Oldsmobile, or intermediate bolt circles. The utility of the kit is based on a novel lug bolt adaptor with an eccentric internally threaded bore. Said adaptor is a main feature of the invention.

This adaptor bolt and the kit including it is described in detail hereinafter.

FIG. 2 shows in side elevation an eccentric lug used in a preferred modification of this invention.

FIG. 3 is a sectional view of FIG. 2 taken along the line 3—3, in a plane perpendicular to the plane of the drawing and in the direction of the observer.

FIG. 4 is a bottom plane view of the lug adaptor of FIG. 2.

FIG. 5 is a top plan view of the lug adaptor with an additional feature, and

FIG. 6 is a cross-sectional view taken on line 6—6 of FIG. 5.

Figure 1:
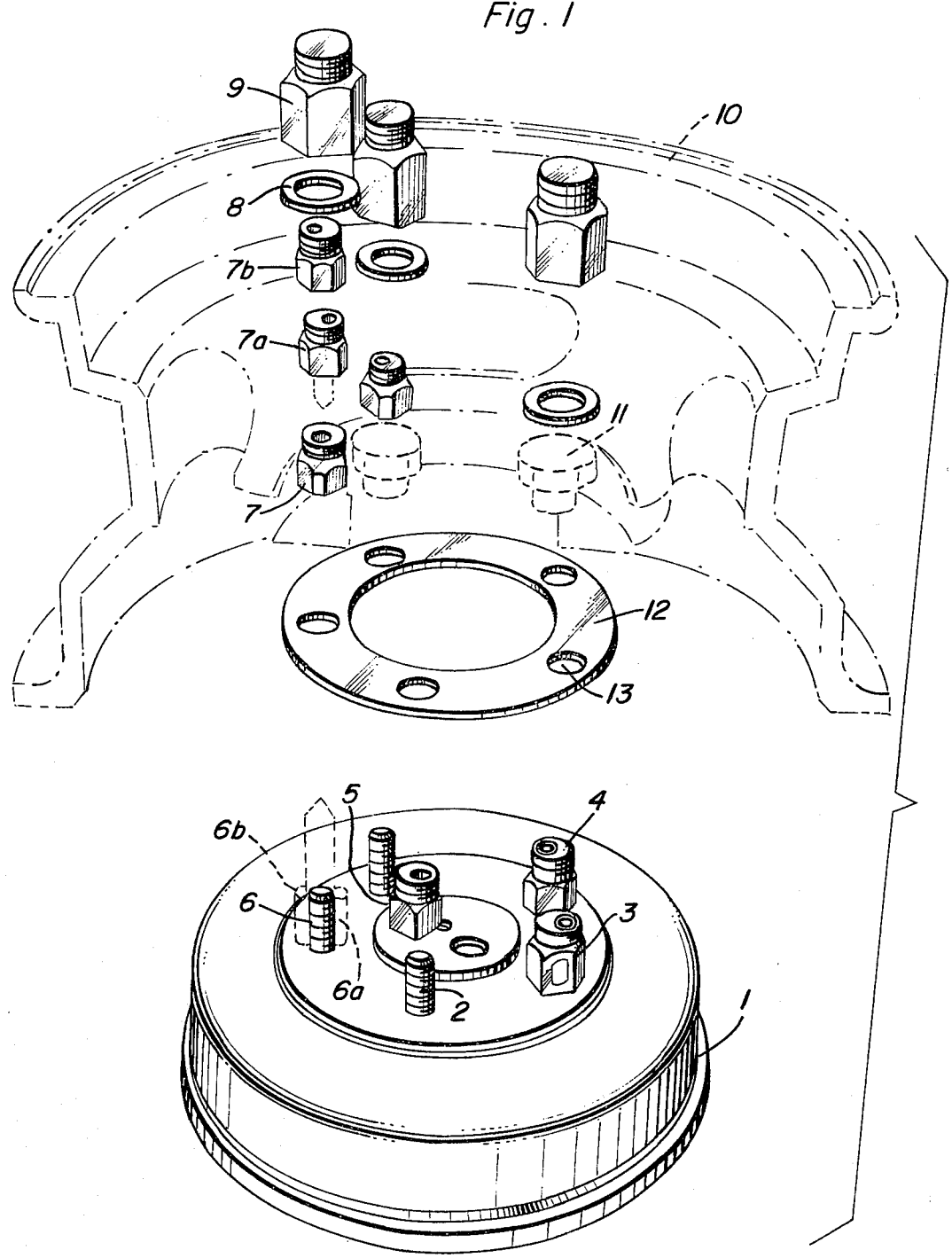
FIG. 1 is an exploded perspective view of representative parts of the adaptor device of one embodiment of this invention.

Referring again to FIG. 2, the base of the lug nut 3 is shown at 15. This base is suitably hexagonal or polygonal, but can actually be any shape readily adapted to be turned by a wrench. The base is counter-bored slightly at 16, so that the lug adaptor will fit readily over all standard bolts, most of which have a collar at the base of the bolt. The internal bore of the lug adaptor is shown at 17. The internal threads of this internal bore 17 can be of uniform diameter in the case where the template ring 12 is used. If the bore is uniform, the lug adaptor will be fairly loose on the lug bolts, and they will have to be held in position with the template ring or equivalent. When the template ring is omitted lug adaptors having compressed internal threadings, at least in a portion of the upper threads, should be used to provide a tight frictional fit on the lug bolts. This is described in more detail in the section hereinafter dealing with "Kit Without Template".

Kit With Template

Referring to FIG. 1, at 1 is shown generally an automobile wheel drum. This drum is fitted with bolts or studs, 2. These bolts or studs and drum of course appear on any car, and are not a part of this invention. At 3 and 4 are shown two adaptor lugs of this invention. These lugs are eccentrically bored, and the bore is internally threaded to fit the bolts on the drum. The upper part of each lug is externally threaded. At 5 is shown an adaptor lug in expanded relationship with the bolt 2. Lug 5 is ready to be screwed down onto bolt 2. At 6 is shown another bolt, and the dotted lines show possible variations of bolt position, 6a showing a bolt having a smaller diameter bolt circle and 6b showing a bolt having a larger diameter bolt circle. 12 shows a template ring carrying a plurality of holes adapted to fit snugly around the base of each lug adaptor when the lug adaptors are screwed down onto the bolts and then turned a specific amount counterclockwise (as hereinafter explained). 7 shows a lug adaptor in an intermediate position; 7a shows the same lug adaptor turned to provide a lug circle slightly larger, and 7b shows the same lug adaptor turned to provide a lug circle slightly smaller. In this connection, and referring to 7, 7a, and 7b, it will be noted that 7 gives the same circle diameter as the pre-existing bolt circle. For example, if the pre-existing bolt circle is 4¾ inches, as is the case with a Chevrolet, 7 would have the same circle diameter. If, on the other hand, the original bolt circle were the Ford bolt circle of 4½ inches as shown in 6a then the lug adaptor would be turned to position 7a, to give a larger diameter circle of 4¾ inches. If, on the other hand, the bolt is in position 6b, i.e., it has the larger diameter 5-inch bolt circle of the Oldsmobile, then it must be rotated to the position shown in 7b to reduce the effective bolt circle diameter.

8 shows a washer, preferable but optional, and 9 shows the capping nut. At 10 is shown generally in dotted outline a wheel containing a plurality of recessed bolt holes 11.

This kit is used as follows. First the adaptor lugs (i.e., as shown at 3, 4, etc.) are screwed onto lugs such as those shown at 2. The adaptor lug is screwed completely onto the bolt. Then each adaptor lug is rotated counter-clockwise slightly (generally less than a full turn) so that all five adaptor lugs will be in a position exactly to receive template 12. Template 12 is then placed over the plurality of adaptor lugs. The holes 13 in template 12 are pre-formed to be the same circle diameter as the holes 11 in wheel 10 (in this example, 4¾ inches). Template 12 is sufficiently thick so that the required slight rotation of the adaptor lugs (3,4, etc.) is not sufficient to permit the edge of the template holes 13 to slide between the lugs and the wheel drum. Next the wheel is mounted on the plurality of lugs. If washers are used (and they are preferred), they are then placed into the recesses of the bolt holes 11, and the cap nuts 9 are then screwed onto the threaded areas of the lug adaptors. This completes the operation.

Kit Without Template

In a preferred embodiment of this invention the template ring 12 is omitted. This omission is feasible in this instance because the lug adaptors (shown generally at 3 and 4) are of a special type in which the upper one-third of the internal threads is compressed. Means for compressing these internal threads is well known in the machinist art. Such compression gives a tighter fit when the lug adaptor is screwed onto the bolts, 2. This fit is sufficiently tight that the lug adaptors have to be rotated with a wrench. Once rotated to a predetermined selected position, however, they remain in that position indefinitely, until again moved with a wrench. Accordingly in this embodiment the lug adaptors are screwed down tight against the drum plate of the automobile. The last turns will have to be made by a wrench owing to the compression above mentioned. Then each lug adaptor is rotated counter-clockwise (again, a wrench will be necessary) until the proper position is attained. This is readily discernible by eye. Then the wheel can be mounted on these lug adaptors and washers and lug nuts or caps screwed on with a narrow-wall socket tire wrench.

When using this embodiment, a useful phenomenon generally occurs. When the wheel is mounted through its lug holes over the adaptor lug bolts, the washers inserted, and the nut caps tightened, a slight clockwise rotation of the adaptor lugs may be noted. This results in a further tightening of the wheel against the drum lugs.

While a particularly advantageous embodiment of the invention has been described in the text and illustrated in the drawing, it will be recognized by those skilled in the art that various changes and modifications can be made therein without departing from the scope of the invention defined by the appended claims. For example, as should be readily apparent to those skilled in the art, the number and thickness of the bolts, lug adaptors, number of holes in the template 12, degree of eccentricity in the adaptors, can be varied to meet the needs of any particular wheel system. The drawing shows five bolts, but any plurality of bolts more or less than this figure can be used, e.g., 4, 6, etc. Also the bolt circle diameter can vary substantially from the values given below.

When omitting the template, a special wrench can be used to achieve the desired alignment. Such wrench is used as follows. First, the eccentric lug bolts are tightened against the drum. Then the bolt is loosened approximately one turn, then the special wrench is used to position it. In making this positioning, however, the eccentric lug is not tightened up completely, because the handle of the wrench is permitted to rest against the next eccentric bolt (next in a clockwise sense). The socket space is oriented in the wrench such that, taken with the handle width, the positioning process will give a quick and exact angular orientation of the eccentric bolt to produce the desired bolt circle. Different wrenches can be used for different bolt circles, or, if desired, three or more wrench molds can be combined into one tool.

Friction Resistant Plastic Plug

In a preferred embodiment of the invention shown in FIG. 6 the adaptor lugs (i.e., 3 and 4) are drilled in the side and fitted with a nylon or other plastic friction-resistant plug 20. For example, looking at FIGS. 5 and 6 the adaptor lug is drilled perpendicular to the axis of bore 17. The drilling is done about half way up the length of the lug, suitably so that the center line of the drilled hole is about 3/32 inch up from the beginning of the external threads. The size of the hole (and of the nylon plug) can vary, but is preferably about ⅛ of an inch. The hole can be drilled at the thin part of the lug, i.e., at the top of the plan area as shown in FIG. 4, or at either side (which would be intermediate areas) as shown, or at the thickest area which would be through the bottom, again looking at FIG. 4. We prefer, however, that the hole be drilled through the side, since this appears to give an adequate size plug without excessive drilling and also provides the frictional resistance which is the purpose of the plug. The plastic plug is permitted to extend slightly into the interior of bore 17, as shown, where it will make contact with the threads of the lugs 2 on the wheel drum, 1. Plastics other than nylon can be used. This type of frictional plug is well known in the art, and is described, for example, in U.S. Pat. 2,725,915. Apparently, however, it has never before been described or used with an eccentric lug nut for vehicle wheels.

When using the plastic plug embodiment it is not necessary to use template 12. The adaptor lugs are readily positioned in the following manner. First of all, they are screwed finger tight onto the drum lugs. Then they are screwed down with a wrench to the drum base. Then they are turned back counterclockwise until they are turned to the correct adapting position for the wheels to be mounted. Frequently there will be only two positions requiring consideration, one with the thick part of the adaptor lug pointing outward, and the other with the thick part of the adaptor lug pointing inward. These positions are readily determined by visual inspection. Open wrenches of the spark plug type can be used for rapid adjustment. If desired, for convenience the T-bar of such wrench can be marked to point in the direction of the thick part of the adaptor lug, when putting the wrench on the lug, so that orientation of the lug will be at all times evident without removing the wrench for inspection. The nylon plug 20 will hold the thus adjusted adaptor lugs in good steady position until the wheel is mounted on the drum. Theoretically an infinite number of intermediate positions between the thick area pointing out and the thick area pointing in are achievable by this means. For purposes of simplicity only the two extremes have been described.

What is claimed is:

1. In combination, a vehicle wheel having a circle of round mounting holes therein, a set of adaptor bolts for mounting said vehicle wheel onto a circle of vehicle wheel mounting studs, wherein said mounting holes, said bolts, and said studs are all equal in number but said mounting holes and said studs may be located on different diameter circles, each said adaptor bolt comprising an internally threaded bore for cooperation with a mounting stud, said bolt being small enough to fit entirely through a wheel mounting hole, said bolt having external threads adapted to mate with means to hold said wheel on said studs, and said internally threaded bore being eccentrically located in said adaptor bolt with respect to said external threads, whereby said adaptor bolts can mount a wheel formed with one diameter circle of openings onto any one of a plurality of different circle diameters of wheel mounting studs.

2. The combination of claim 1, and means to increase the friction between said stud and said internally threaded bore.

3. The combination of claim 2, wherein said friction increasing means comprises plastic material in said internally threaded bore.

4. The combination of claim 2, wherein said friction increasing means comprises a hole formed through said adaptor bolt generally transversely to the axis of said bore and communicating with said internally threaded bore, and a plug of friction resistant material tightly fitted in said hole and extending at least partially into said internally threaded bore.

5. The adaptor bolt of claim 4, wherein said material consists of relatively hard nylon.

6. The adaptor bolt of claim 1, and a counter-bore formed in the base end of said adaptor bolt concentrically with said internally threaded bore.

7. The adaptor bolt of claim 1, wherein said bolt comprises a base end having a polygonal external surface and being larger than the outside externally threaded portion of said bolt.

8. The adaptor bolt of claim 7, and a counter-bore formed in the base end of said adaptor bolt concentrically with said internal threaded bore.

* * * * *